US012677204B2

(12) United States Patent
Samardzija et al.

(10) Patent No.: US 12,677,204 B2
(45) Date of Patent: Jul. 7, 2026

(54) COMPUTERIZED SYSTEMS AND METHODS FOR NETWORK EXPANSION VIA CONNECTIVITY NODES AND EVENT DETECTION BASED THEREFROM

(71) Applicant: PLUME DESIGN, INC., Palo Alto, CA (US)

(72) Inventors: Miroslav Samardzija, Mountain View, CA (US); Trevor Sands, Atlanta, GA (US); Dariusz Kopka, Warsaw (PL); Gal Trapecar, Ljubljan (SI); Grigor Ristov, Ljubljan (SI); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 371 days.

(21) Appl. No.: 18/300,809

(22) Filed: Apr. 14, 2023

(65) Prior Publication Data

US 2024/0349154 A1 Oct. 17, 2024

(51) Int. Cl.
*H04W 36/32* (2009.01)
*H04W 36/14* (2009.01)

(52) U.S. Cl.
CPC .......... *H04W 36/32* (2013.01); *H04W 36/14* (2013.01); *H04W 36/322* (2023.05)

(58) Field of Classification Search
CPC .... H04W 36/14; H04W 36/32; H04W 36/322
See application file for complete search history.

(56) References Cited

U.S. PATENT DOCUMENTS

| | | | |
|---|---|---|---|
| 8,868,616 B1 | 10/2014 | Otto et al. | |
| 2013/0141233 A1* | 6/2013 | Jacobs | G08B 21/043 |
| | | | 340/521 |
| 2014/0285343 A1 | 9/2014 | Parker et al. | |
| 2018/0270612 A1 | 9/2018 | Thoresen et al. | |
| 2019/0069154 A1 | 2/2019 | Booth et al. | |

(Continued)

OTHER PUBLICATIONS

International Search Report and Written Opinion from corresponding International Application No. PCT/US2024/024204, mailed Jun. 11, 2024, 22 pages.

*Primary Examiner* — William G Trost, IV
(74) *Attorney, Agent, or Firm* — Nicholas Martin; Greenberg Traurig, LLP

(57) ABSTRACT

Disclosed are systems and methods that provide a computerized framework that provides functionality for an expanded node-based network that can dynamically adapt to the location/position of a location tracker, while enabling the tracker to automatically trigger security and/or safety features for its associated user/item. The disclosed framework can dynamically and automatically compile connectivity nodes of disparate networks to provide (both low-cost and high-end) trackers continuous network coverage. Effectively, the disclosed framework can provide trackers with an adaptive Internet of Things (IoT)-type network that leverages connectivity nodes of specific networks to provide and maintain connectivity the tracker as the tracker traverses the real-world. Moreover, the tracker can provide capabilities that automatically can detect specific types of events, which can trigger notifications, alerts and/or remedial measures that are all enabled via the novel network connectivity provided via the disclosed framework.

20 Claims, 9 Drawing Sheets

(56) References Cited

U.S. PATENT DOCUMENTS

| | | | |
|---|---|---|---|
| 2020/0112834 A1* | 4/2020 | Villa ..................... | H04W 4/029 |
| 2020/0380436 A1* | 12/2020 | Bonomo ............ | G06Q 10/1091 |
| 2021/0319894 A1 | 10/2021 | Sobol et al. | |

* cited by examiner

400

402 — Connect UE to a network

Perform Process 450

404 — Monitor location of UE and connectivity of the network

406 — Identify another network

408 — Determine whether to connect to other network based on location of UE and current network connectivity     no yes 410 — Connect to other network

COMPUTERIZED SYSTEMS AND METHODS FOR NETWORK EXPANSION VIA CONNECTIVITY NODES AND EVENT DETECTION BASED THEREFROM

FIELD OF THE DISCLOSURE

The present disclosure is generally related to a network monitoring system, and more particularly, to a decision intelligence (DI)-based computerized framework for automatically and dynamically extending and/or creating network coverage for a location from which event detection and remediation can be provided.

BACKGROUND

Location tracking, which can be provided by a device(s) and/or system operating on a network, can enable localization of people or items. For example, the geographic location of a user as indicated by their mobile device. In another example, the location of a child's backpack as indicated by a tracking fob within a pocket of the device. Such functionality can be provided to users via existing and publicly available wireless networks.

SUMMARY OF THE DISCLOSURE

However, capabilities of conventional location tracking are restricted to the types of networks from which such tracking is enabled. For example, if a tracker connects to a cellular network, the manner in which an associated user/item is tracked is tied to the coverage, type and capabilities of such network. For example, a user can be tracked via their tracker by triangulation and/or global positioning system (GPS) data as enabled via a cellular network. This, however, has drawbacks, both economical and technological, as the cost to provide such services is expensive, as are the costs for manufacturing such devices, and the reliability and accuracy are minimized via bandwidth constraints on the network.

In another example, a tracker can rely on WiFi or other localized networks (e.g., Zigbee, for example); however, the coverage provided by the source network is minimal at best. That is, for example, if a user connects to their home WiFi network, once they are outside the range of that network (e.g., outside the house), the tracker becomes effectively useless since there is no available network coverage.

Accordingly, the disclosed systems and methods provides a novel computerized framework that addresses the shortcomings in the field, among others, and provides novel functionality for an expanded node-based network that can dynamically adapt to the location of the tracker, while enabling the tracker to automatically trigger security and/or safety features for its associated user/item.

According to some embodiments, the disclosed tracker can be any type of known or to be known tracker device, application and/or system, which can be embodied as, but not limited to, a smart ring, key fob, bracelet, smart watch and/or any other type of known or to be known wearable device, a mobile device (e.g., smart phone), for example, and the like, or some combination thereof.

As mentioned above, cellular network-based trackers are expensive, and can suffer from inaccuracies and unnecessary resource usage. Conversely, short-range network-based trackers (e.g., WiFi networks, for example) are inexpensive, yet are restricted in their applicability in the real-world given their inherent limited network coverage.

As such, according to some embodiments, the disclosed framework provides a novel technical solution that can dynamically and automatically compile connectivity nodes of disparate networks to provide (both low-cost and high-end) trackers continuous network coverage. Effectively, as provided herein, the disclosed framework can provide trackers with an adaptive Internet of Things (IoT)-type network that leverages connectivity nodes of specific networks to provide and maintain connectivity the tracker as the tracker traverses the real-world.

Moreover, in some embodiments, the tracker can provide capabilities that automatically can detect specific types of events, which can trigger notifications, alerts and/or remedial measures that are all enabled via the novel network connectivity provided via the disclosed framework.

According to some embodiments, a method is disclosed for a DI-based computerized framework for automatically and dynamically extending and/or creating network coverage for a location from which event detection and remediation can be provided. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for automatically and dynamically extending and/or creating network coverage for a location from which event detection and remediation can be provided.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
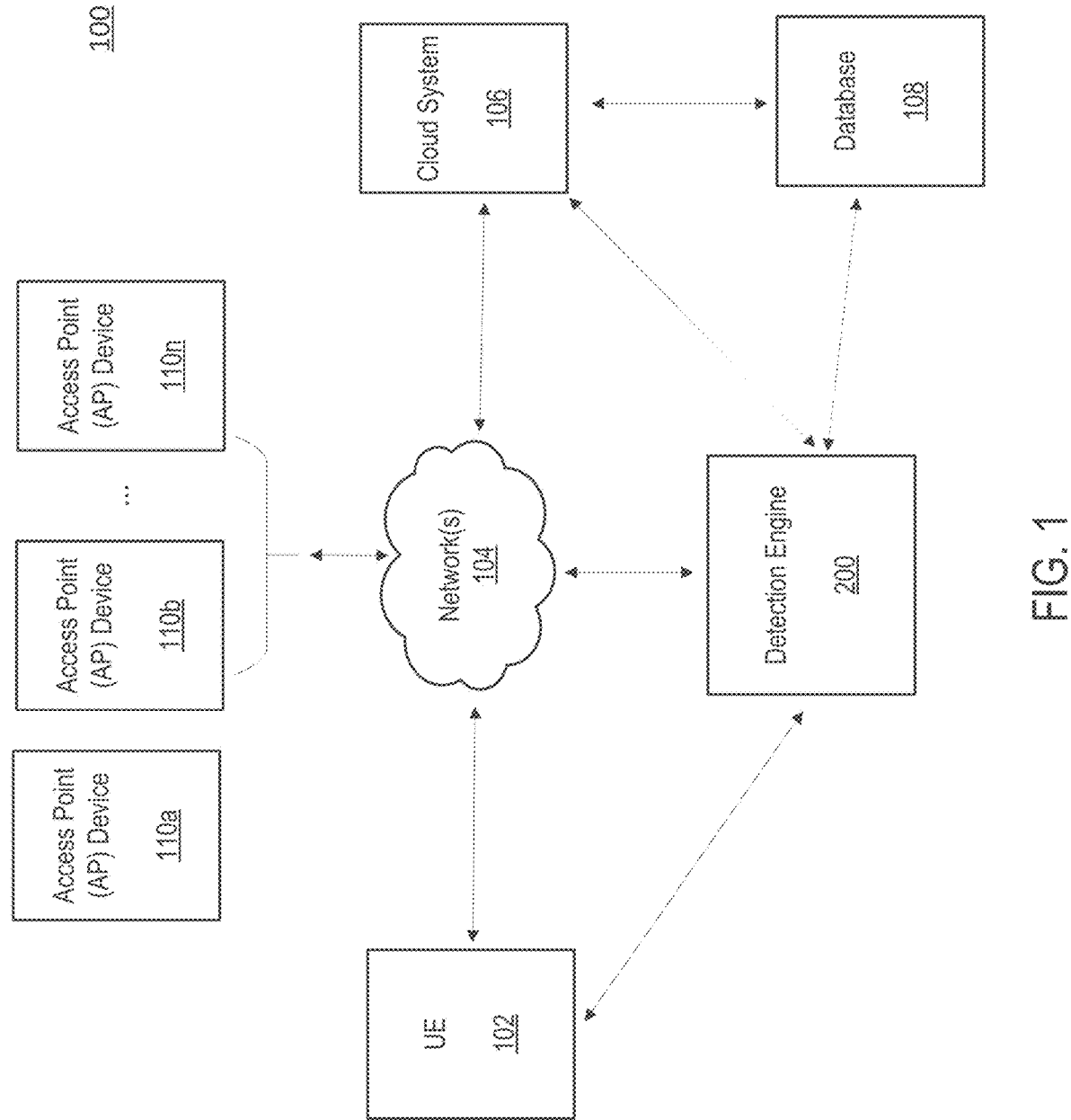
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. According to some embodiments, the disclosed framework provides an integrated, crowd-sourced type network that can be utilized to provide security features for users and/or items associated with a location tracker. As discussed herein, according to some embodiments, the disclosed framework can monitor and dynamically identify and enable a tracker to connect to localized networks as the tracker traverses a geographic space (e.g., moves around), whereby connectivity to a type of network that facilitates Internet access is continuously enabled. Such novel, continuous network connectivity via crowd-sourced networks provide capabilities for the tracker to monitor and provide safety/security mechanisms to ensure the integrity and/or well-being of its associated user/item. For example, the tracker can detect a movement associated with a fall (e.g., via a gyroscope of the tracker), which can cause the tracker to send an alert to a first responder (or other user, such as an emergency contact, for example). Further discussion of such capabilities are discussed below.

With reference to FIG. 1, system 100 is depicted which includes user equipment (UE) 102 (e.g., a client device, for example, as discussed below in relation to FIG. 7), access point (AP) devices 110a, 110b, . . . 110n, network(s) 104, cloud system 106, database 108, and detection engine 200.

It should be understood that while system 100 is depicted as including such components, it should not be construed as limiting, as one of ordinary skill in the art would readily understand that varying numbers of UEs, AP devices, peripheral devices, cloud systems, databases and networks can be utilized; however, for purposes of explanation, system 100 is discussed in relation to the example depiction in FIG. 1.

According to some embodiments, UE 102 can be any type of device, such as, but not limited to, a location tracker (e.g., smart ring, key fob, for example), a mobile phone, tablet, laptop, sensor, IoT device, autonomous machine, and any other device equipped with a cellular or wireless or wired transceiver.

For example, UE 102 can be a smart ring, which as discussed below in more detail, can enable the identification and/or collection of movements and/or vitals of the wearing user. In some embodiments, such movements can be detected via a gyroscope and/or accelerometer of the UE 102, and correspond to, but are not limited to, type of motion, speed of motion, angle of motion, trajectory of motion, rotation of motion, duration of motion, and the like, or some combination thereof. In some embodiments, such vitals (or biometrics, used interchangeably) can correspond to, but not be limited to, heart rate, heart rate variability (HRV), blood oxygen levels, blood pressure, hydration temperature, pulse, motion, sleep, and/or any other type of biometric for a person, or some combination thereof.

In some embodiments, peripheral device (not shown) can be connected to UE 102, and can be any type of peripheral device, such as, but not limited to, a wearable device (e.g., smart ring or smart watch), speaker, sensor, and the like. In some embodiments, peripheral device can be any type of device that is connectable to UE 102 via any type of known or to be known pairing mechanism, including, but not limited to, WiFi, Bluetooth™, Bluetooth Low Energy (BLE), NFC, and the like. For example, the peripheral device can be a smart ring that connectively pairs with UE 102, which is a user's smart phone.

According to some embodiments, AP devices 110a, 110b, . . . 110n are devices that can create/provide a wireless network, cellular network, the Internet, and the like. For example, AP device 110a can provide wireless local area network (WLAN) for a location; and AP device 110b can be a node that provides a cellular network for another location. It should be understood that there can be any number and/or type of AP devices, as indicated by AP devices 110a, 110b, . . . 110n. Accordingly, in some embodiments, each AP devices 110a, 110b, . . . 110n can be, but is not limited to, a network node, antenna, a router, switch, hub and/or any other type of network hardware that can project a wireless/cellular network signal to a designated area. In some embodiments, UE 102 may be an AP device (e.g., UE 102 providing a hotspot for a location).

Figure 3A:
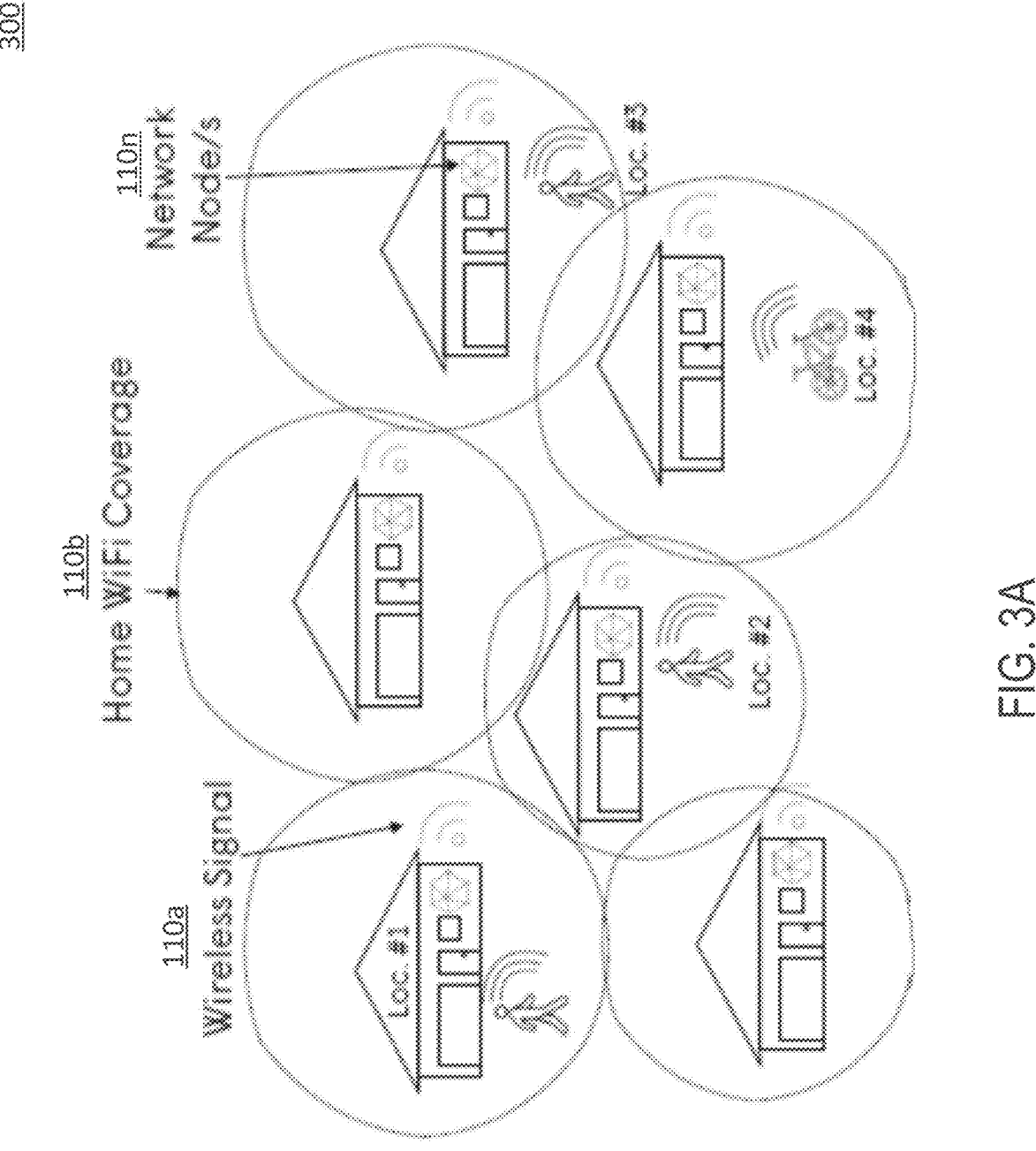
FIGS. 3A-3B illustrate exemplary embodiments for implementation of the disclosed systems and methods according to some embodiments of the present disclosure.

According to some embodiments, each AP devices 110a, 110b, . . . 110n may correspond to a specific network, whereby such network can enable access to the Internet (e.g., network 104, for example). For example, as depicted in example embodiment 300 in FIG. 3A, AP device 110a may correspond to the "wireless signal" thereby enabling a wireless network (e.g., a Zigbee network, for example), AP device 110b may correspond to "Home WiFi Coverage" (e.g., WiFi network), and AP device 110n may correspond to a cellular network node(s). Thus, each of these APs can enable access to the Internet, which as depicted in FIG. 1, can be depicted as network 104.

In some embodiments, network 104 can be any type of network, such as, but not limited to, a wireless network, cellular network, the Internet, and the like (as discussed above). Network 104 facilitates connectivity of the components of system 100, as illustrated in FIG. 1. Thus, in some embodiments, network 104 can be embodied as the network providing access to the Internet for a specific AP device (as in FIG. 3A, discussed supra), and in some embodiments, network 104 may be the Internet, as discussed herein.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a smart home or network provider, which has associated network resources hosted on the internet or private network (e.g., network 104), which enables (via engine 200) the network connectivity framework discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102, AP devices 110a, 110b, . . . 110n, and the services and applications provided by cloud system 106 and/or detection engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 5:
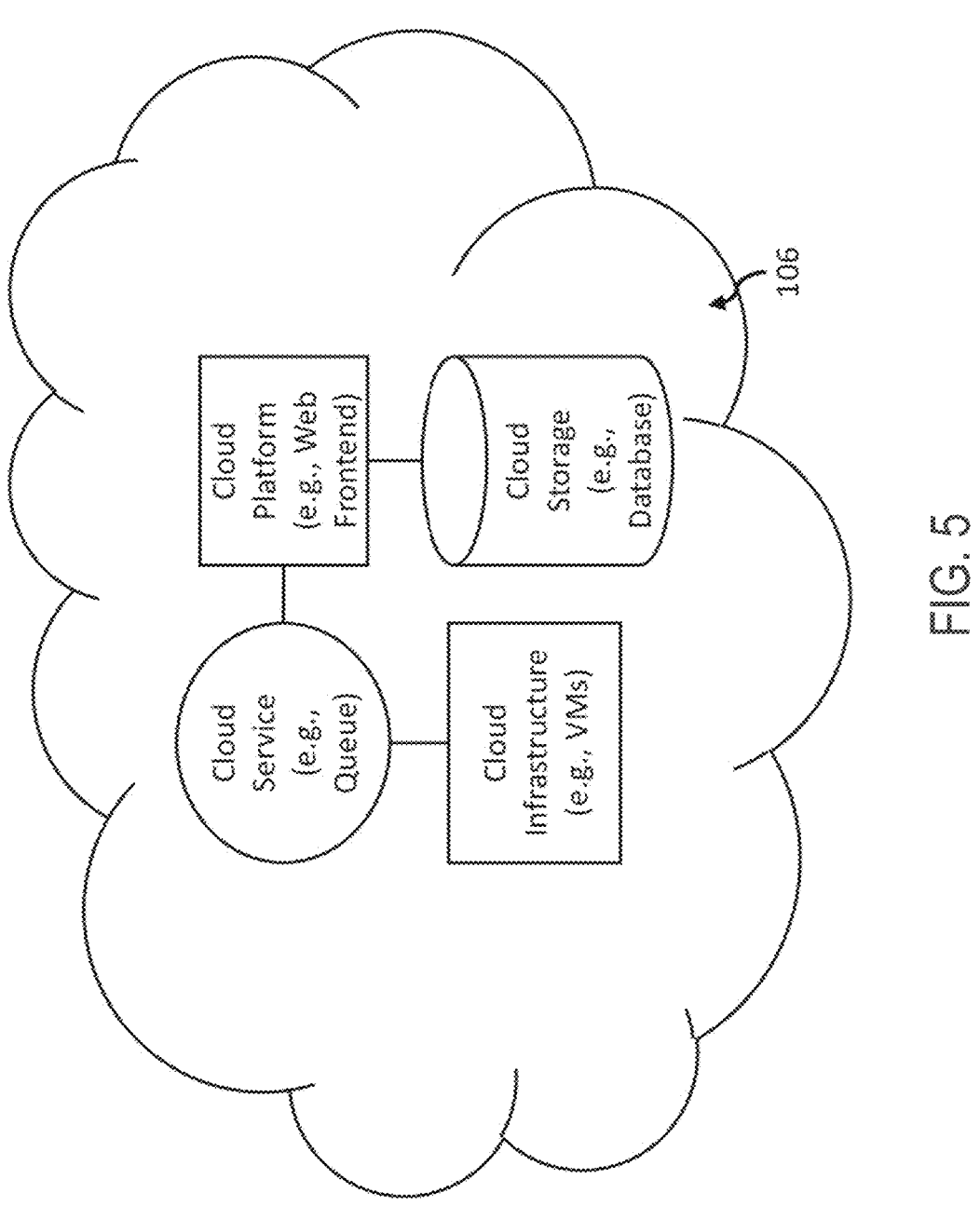
FIG. 5 depicts an exemplary implementation of an architecture according to some embodiments of the present disclosure.
Figure 6:
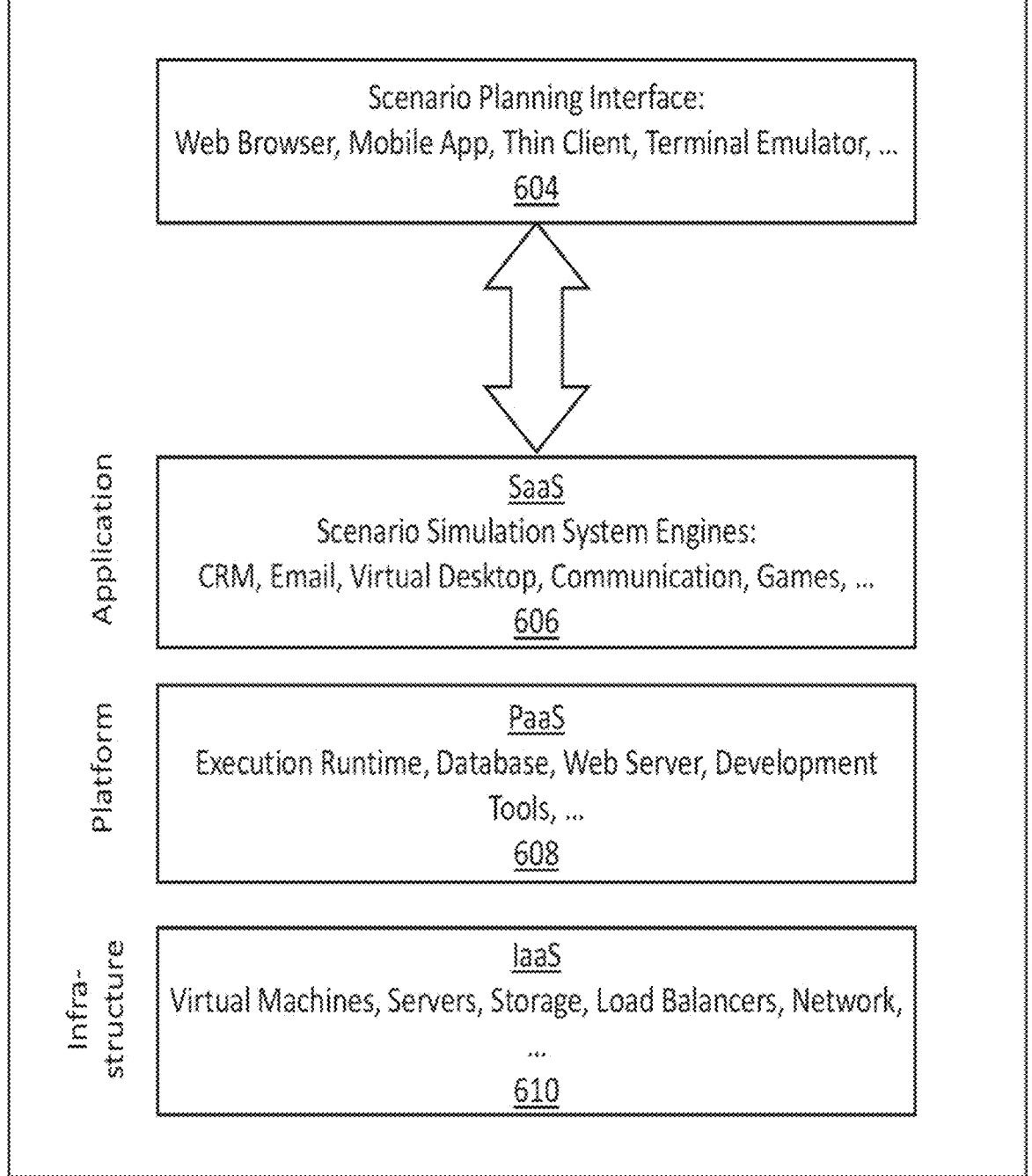
FIG. 6 depicts an exemplary implementation of an architecture according to some embodiments of the present disclosure.

Turning to FIGS. 5 and 6, in some embodiments, the exemplary computer-based systems/platforms, the exemplary computer-based devices, and/or the exemplary computer-based components of the present disclosure may be specifically configured to operate in a cloud computing/architecture 120 such as, but not limiting to: infrastructure as a service (IaaS) 610, platform as a service (PaaS) 608, and/or software as a service (SaaS) 606 using a web browser, mobile app, thin client, terminal emulator or other endpoint 604. FIGS. 5 and 6 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository Detection engine 200, as discussed above and further below in more detail, can include components for the disclosed functionality. According to some embodiments, detection engine 200 may be a special purpose machine or processor, and can be hosted by a device on network(s) 104, within cloud system 106, on AP devices 110a, 110b, . . . 110n and/or on UE 102. In some embodiments, engine 200 may be hosted by a server and/or set of servers associated with cloud system 106.

According to some embodiments, as discussed in more detail below, detection engine 200 may be configured to implement and/or control a plurality of services and/or microservices, where each of the plurality of services/microservices are configured to execute a plurality of workflows associated with performing the disclosed network management and location tracking capabilities. Non-limiting embodiments of such workflows are provided below in relation to at least FIGS. 4A-4B.

According to some embodiments, as discussed above, detection engine 200 may function as an application provided by cloud system 106. In some embodiments, engine 200 may function as an application installed on a server(s), network location and/or other type of network resource associated with system 106. In some embodiments, engine 200 may function as application installed and/or executing on UE 102 (and/or AP devices 110a, 110b, . . . 110n, in some embodiments). In some embodiments, such application may be a web-based application accessed by AP devices 110a, 110b, . . . 110n, UE 102 and/or devices over network 104 from cloud system 106. In some embodiments, engine 200 may be configured and/or installed as an augmenting script, program or application (e.g., a plug-in or extension) to another application or program provided by cloud system 106 and/or executing on AP devices 110a, 110b, . . . 110n and/or UE 102.

Figure 2:
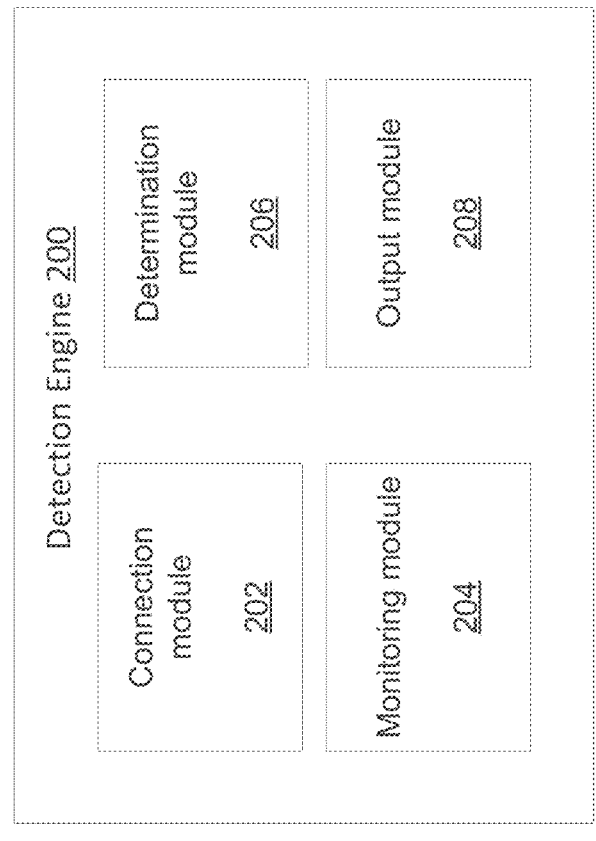
FIG. 2 is a block diagram illustrating components of an exemplary system according to some embodiments of the present disclosure.

As illustrated in FIG. 2, according to some embodiments, detection engine 200 includes connection module 202, monitoring module 204, determination module 206 and output module 208. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below.

Figure 3B:
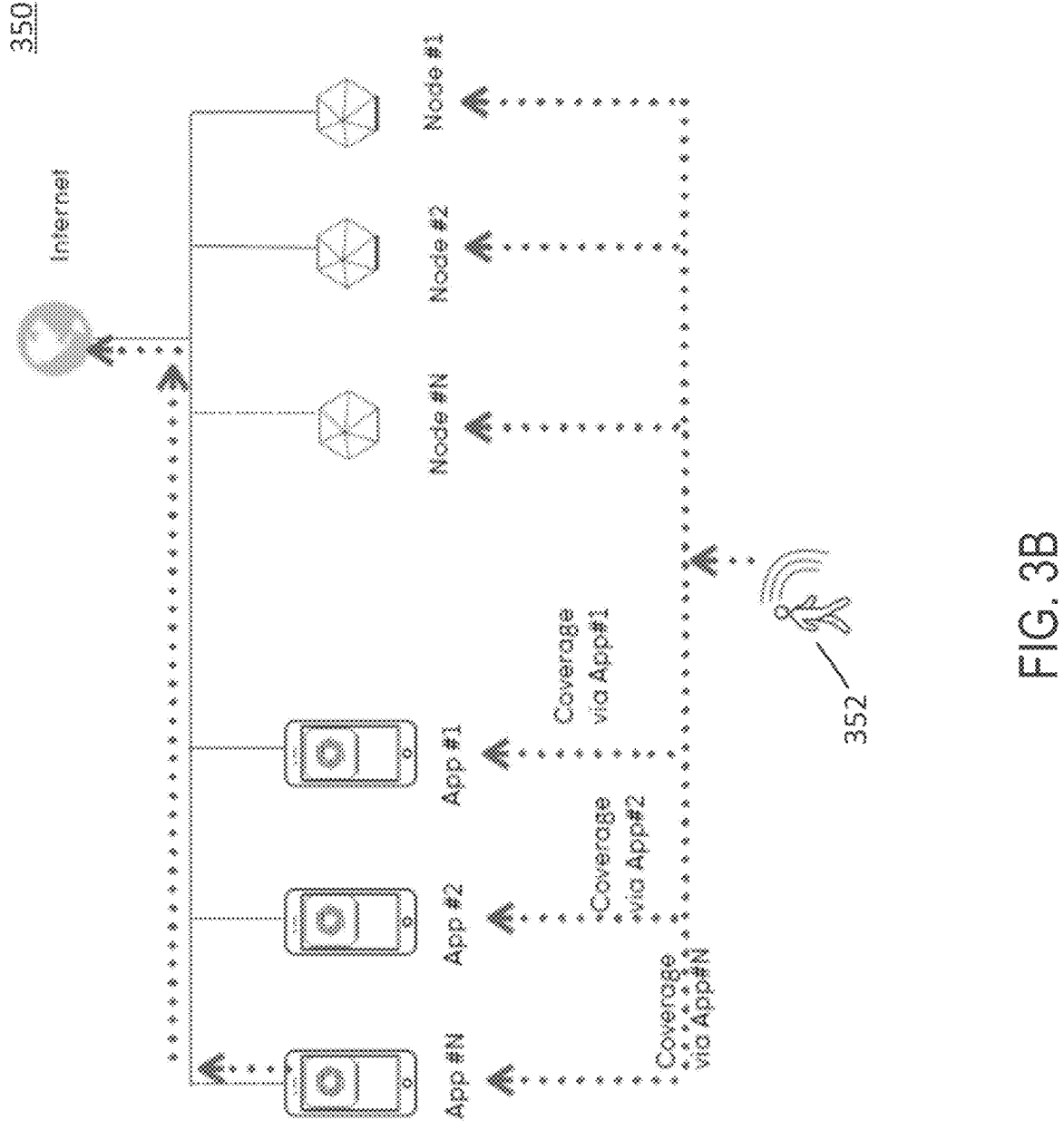

Turning to FIG. 3B, depicted is a non-limiting example 350 for which user 352 can be tracked via the crowd-sourced network connectivity functionality discussed herein. According to some embodiments, user 352 can be carrying and/or have associated with UE 102. For example, UE 102 can be a mobile device executing an application associated with engine 200.

Accordingly, in some embodiments, according to example embodiment 352, as user 352 traverses a geographic area (e.g., walks around their neighborhood, for example), her UE 102 can connect to each node (e.g., Node #1, 2, . . . . N, as depicted in FIG. 3B.

For example, Node #1 may be associated with an AP device that provides a WiFi network for the house/home of user 352. Node #2 may be the WiFi network of an adjacent neighbor of user 352 (e.g., as user 352 walks past the neighbor's house). And, Node #3 may be a cellular network for a person living down the street from user 352.

Thus, in such example, user 352 starts in her house, and therefore is connected to Node #1 (as realized/indicated via "coverage via App #1" in FIG. 3B. When user 352 leaves her house, and walks past her neighbors house, connectivity to Node #1 weakens to a point where no connectivity is provided; therefore, UE 102 can connect to Node #2 (e.g., as indicated in FIG. 3B via "coverage via App #2"). When user 352 moves out of range of the WiFi network of Node #2, UE 102 can detect and connect to the cellular network provided via Node #N. Thus, as indicated by the "arrows" in FIG. 3B, UE 102 associated with user 352 can be provided network connectivity to the Internet via application instance App #N provided by Node #N. Further details of such operations are discussed below in relation to FIGS. 4A-4B.

Figure 4A:
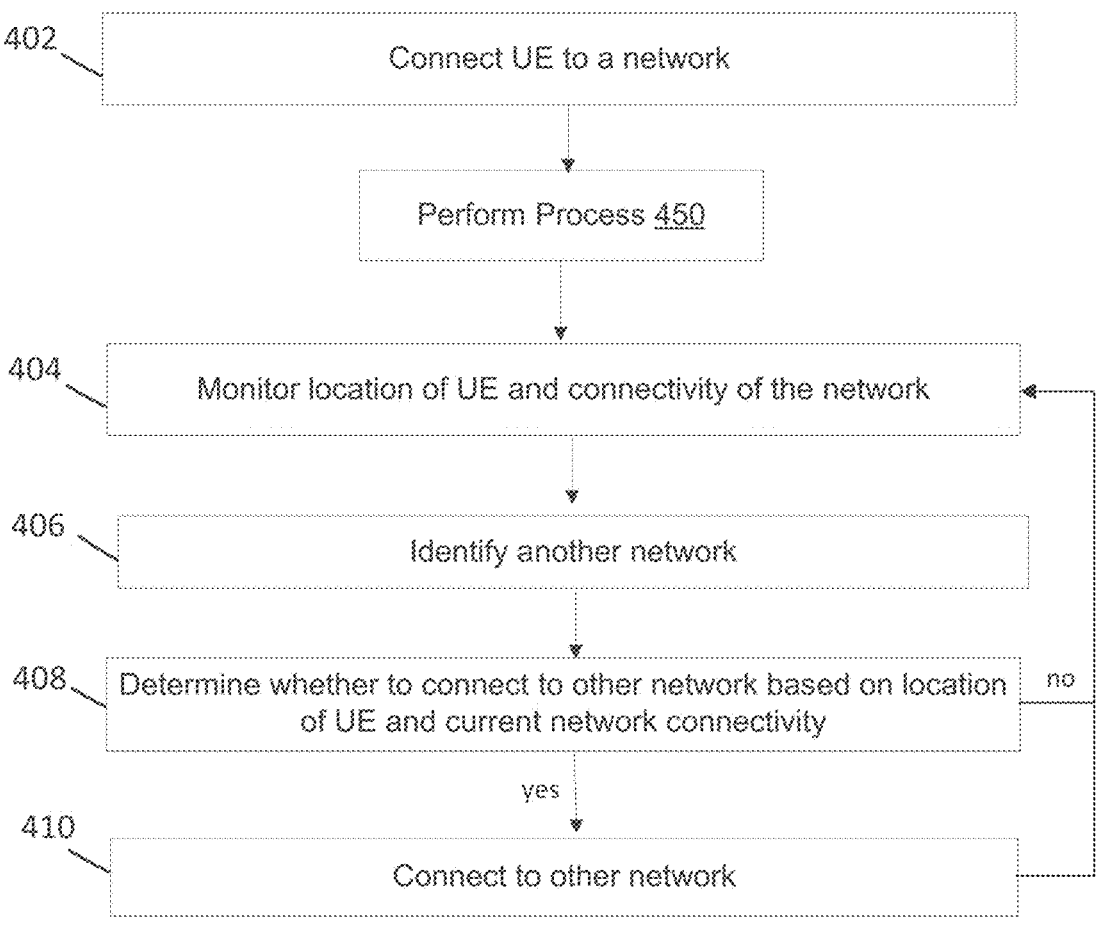
FIGS. 4A-4B illustrate exemplary workflows according to some embodiments of the present disclosure.
Figure 4B:
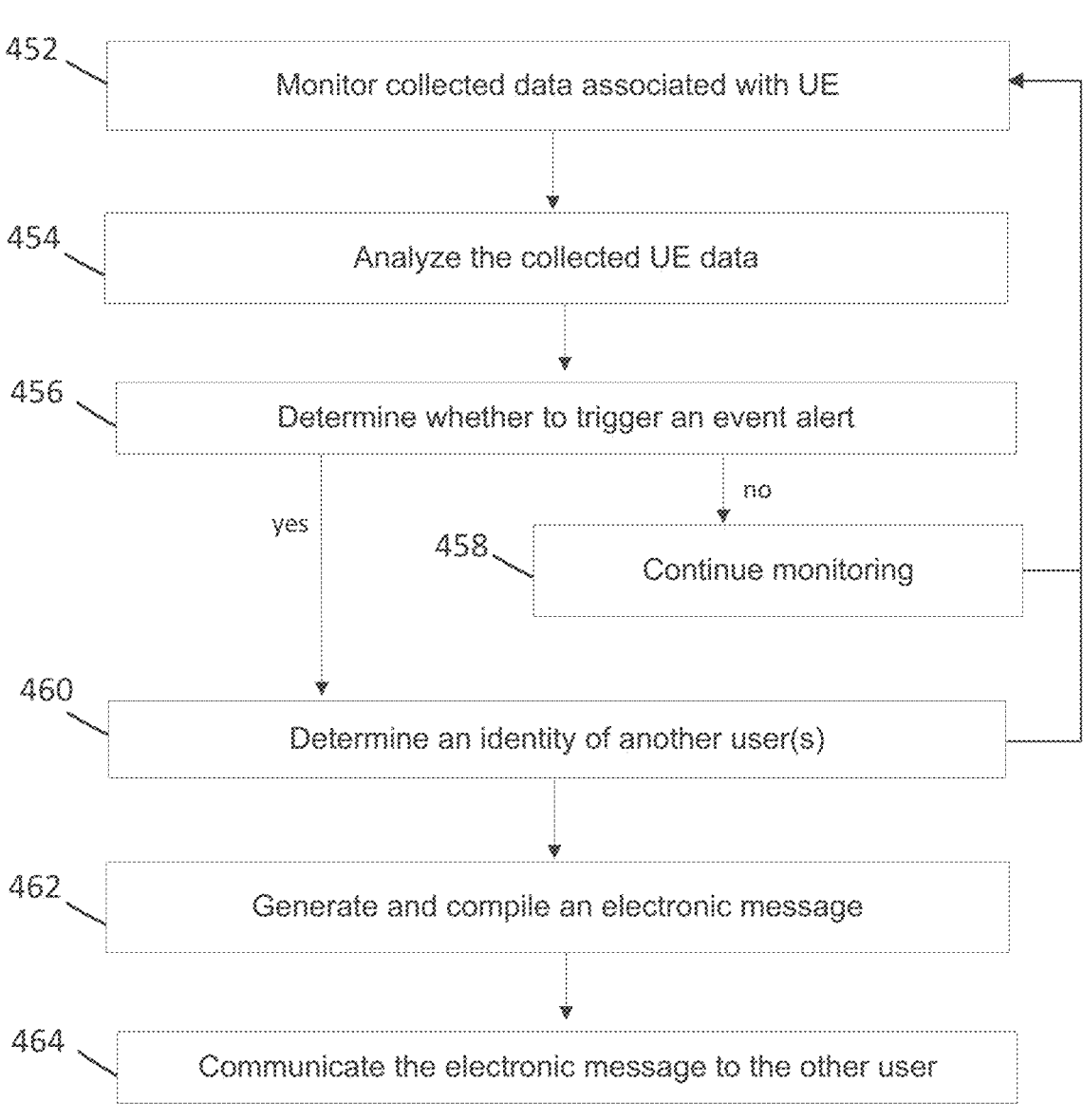

Turning to FIGS. 4A-4B, Processes 400 and 450 provides non-limiting example embodiments for the implementation of the disclosed network and detection framework. As provided herein, FIG. 4A provides Process 400 which enables the community-based network for a location (or set of locations), and FIG. 4B provides Process 450 which details a non-limiting embodiment for usage of such network functionality enabled via Process 400.

In FIG. 4A, according to some embodiments, Steps 402 and 410 of Process 400 can be performed by connection module 202 of detection engine 200; Steps 404-406 can be performed by monitoring module 204; and Step 408 can be performed by determination module 206.

According to some embodiments, Process 400 begins with Step 402 where engine 200 effectuates, causes and/or enables UE 102 to connect to a network. As discussed above, UE 102 can be any type of device, such as, for example, a smart phone or smart ring, which provides tracker capabilities. In some embodiments, UE 102, as discussed above, can be a specifically configured tracker device, such as a key fob, for example.

According to some embodiments, Process 400 (and Process 450, discussed infra) will be discussed with reference to UE 102 being associated with (e.g., carried/worn) by a user; however, as mentioned above, this should not be construed as limiting, as UE 102 can be associated with any type of item (e.g., a smart phone, backpack, luggage, car, and the like). Thus, while the discussion herein will be discussed with reference to an associated user, the scope of the disclosed systems and methods are applicable to an item, as provided herein.

Accordingly, in some embodiments, Step 402 can involve UE 102, via associated network interface components and/or capabilities, scanning a location and identifying a localized network. In some embodiments, such identification of networks can involve identifying a set or plurality of networks, ranking them based on their signal strength, bandwidth and/or familiarity, and connecting to the highest ranked network. For example, if a network has the highest signal strength, but is not the user's "home" network, this may not be ranked highest, therefore, UE 102 may connect to the network that it is familiar with (e.g., the home network).

Accordingly, Step 402 can identify network data, and based on an analysis of the network data, determine network characteristics for each network, which can be utilized and/or further analyzed for purposes of identifying which network to connect to via Step 402. In some embodiments, such characteristics can include, but are not limited to, signal strength, bandwidth (or capacity), channel, security, fault tolerance, Quality of Service (QoS), speed, reliability, type, source location/node, coverage, provider identity and/or type, and the like.

Thus, upon detecting and connecting to an (initial) network in Step 402, processing in Process 400 can proceed to Step 404. According to some embodiments, upon connecting to the network in Step 402, processing can additionally proceed to perform Process 450 (as detailed below at least in relation to FIG. 4B). In some embodiments, Processes 400 and 450 can be performed in parallel, in sequence, as partially overlapping functions/operations, according to clock cycles, and the like, or some combination thereof. Thus, in some embodiments, Process 400 and 450 can be performed in concert with one another so that network connectivity for UE 102 is continuously provided/maintained (e.g., via Process 400), while safety/security monitoring is provided for the user of UE 102 (e.g., via Process 450).

Continuing with Process 400, Step 404 can involve engine 200 monitoring location data of the UE and connectivity of the network (that was connected to in Ste 402). According to some embodiments, such monitoring can be performed according to, but not limited to, a clock cycle, a threshold amount of network data received, positional and/or movement data of UE 102, vitals of the user collected via UE 102, a time period, location data of the UE 102, and the like, or some combination thereof. For example, location data about the user can be collected upon a threshold amount of movement being performed (e.g., UE 102 has moved at least 30 feet in a direction). In some embodiments, the threshold may be based on a type of the network (e.g., for example, moving 30 feet in a direction may not matter to a cellular network; however, this may impact whether a WiFi network maintains coverage for UE 102).

In some embodiments, the connectivity of the network being monitored can correspond to the network characteristics, and can be effectuated via collected network measurements. For example, available bandwidth on the network, number of data packets sent and/or received, which channel the UE 102 is operating on, download speed, and the like, or some combination thereof.

In Step 406, while engine 200 is performing the monitoring of Step 404 (e.g., as part of the monitoring), another network can be detected. For example, a user is connected to their WiFi network (via Step 402); however, as they enter their garage, they pick up a signal from their neighbor's WiFi network.

In some embodiments, Step 406 can involve engine 200 determining the network characteristics of the other identified network, which can be performed in a similar manner as discussed above. For example, a determination of the available bandwidth on the network.

In Step 408, engine 200 can determine whether to connect to the other network (from Step 406) or continue the connection with the network (from Step 402). According to some embodiments, such determination can be based on information related to, but not limited to, the current location of UE 102, movement of UE 102 (e.g., which direction, speed and the like), network characteristics of the connected network, network characteristics of the other identified network, preferences of the user, settings of each network, proximity of an AP device of each node to the current location of the user/UE 102, and the like, or some combination thereof.

For example, a determination can be made as to whether the available bandwidth on the other network is greater than available bandwidth on the current network, and whether the other network covers a greater or more relevant geographic area, among other considerations.

According to some embodiments, such information can be compiled as input parameters for analysis via engine 200 via any type of known or to be known computational analysis technique, algorithm, mechanism or technology.

In some embodiments, engine 200 may include a specific trained artificial intelligence/machine learning model (AI/ML), a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques chosen from, but not limited to, computer vision, feature vector analysis, decision trees, boosting, support-vector machines, neural networks, nearest neighbor algorithms, Naive Bayes, bagging, random forests, logistic regression, and the like. By way of a non-limiting example, engine 200 can implement an XGBoost algorithm for regression and/or classification to analyze the collected data, as discussed herein.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
    b. transfer the input data to the neural network model,
    c. train the model incrementally.
    d. determine the accuracy for a specific number of timesteps,
    e. apply the trained model to process the newly-received input data,
    f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Thus, based on the analysis executed by engine 200, a determination can be made as to whether to hop to another network or maintain the current network connection. In some embodiments, the network from Step 402 may be at or below a threshold signal strength, which may cause the UE 102 to drop the connection. In some embodiments, the analysis may involve ranking the networks (from Step 402 and Step 406), as discussed above, and determining to maintain the connection or move to the other network based on such ranking.

In some embodiments, when Step 408 determines to maintain the connection, engine 200 can recursively proceed back to Step 404 whereby continued monitoring of the location of UE 102, network characteristics of the current network and scanning for other networks can be performed. Thus, continued monitoring for ideal and/or preferred network connections can continually be performed to ensure UE 102 is continuously connected to a network.

In some embodiments, when Step 408 determines to connect to the other identified network, engine 200 can effectuate disconnection (if needed) from the current network, and connection to the other network (from Step 406), which can be performed in a similar manner as discussed above in Step 402. In some embodiments, engine 200 can then recursively proceed to Step 404 to effectuate monitoring of the location of UE 102 and connectivity of the new network (and scanning for other networks), as discussed above.

Turning to FIG. 4B, Process 450 can be performed, which as discussed above, can be performed in relation to the steps of Process 400.

According to some embodiments, Steps 452 and 458 of Process 450 can be performed by monitoring module 204 of detection engine 200; Steps 454, 456 and 460 can be performed by determination module 206; and Steps 462-464 can be performed by output module 208.

According to some embodiments, Process 450 begins with Step 452 where engine 200 can collect and monitor such collected data via UE 102. For example, as discussed above, UE 102 can be configured with sensors, for example, a gyroscope and/or a Photoplethysmography (PPG) sensor; therefore, movement/motion data and vitals/biometrics data can be collected respective to an associated user of UE 102.

In some embodiments, such monitoring in Step 452 can be performed in a similar manner as discussed in relation to Step 404, supra. For example, monitoring can be performed according to a time period, based on a type of movement, according to a type of collected/detected vital sign, upon request, and the like, or some combination thereof.

In Step 454, engine 200 can analyze the collected UE data (from Step 452). According to some embodiments, engine 200 can perform an AI/ML based computational analysis of such data in a similar manner as discussed in relation to Step 408, supra.

Accordingly, in Step 456, based on the analysis in Step 454, engine 200 can determine whether to trigger an event alert. In other words, engine 200 can determine whether the collected data indicates that the user may be in danger. For example, if the movement data indicates that the user has fallen down. In another example, if the vitals data indicates that the user's heart rate is below a threshold range, which may indicate cardiac arrest.

When Step 456 results in a determination that no critical/dangerous event is and/or has occurred via the collected data, engine 200 can recursively proceed back to Step 452, for further collection and monitoring of data from UE 102.

When Step 456 results in a determination to trigger an event alert due to a determination that the collected data provides an indication that the associated user may be in danger (e.g., and/or have their security/safety threatened or infringed), engine 200 can proceed to Step 460.

In Step 460, an identity (ID) of the UE 102, ID of the user and/or indicator of the location of the UE 102 can be utilized to identify another user. In some embodiments, engine 200 can communicate a request a profile hosted by cloud 106/ database 108, whereby an emergency contact for that user can be identified. In some embodiments, the location of the UE 102 can additionally or alternatively leveraged to identify a proximate first responder (e.g., police, firefighter, ambulance, for example). In some embodiments, both an emergency contact and a first responder may be notified, which can be initiated/performed based on a type of detected event.

In some embodiments, when the UE 102 is associated with an item, the owner of the item can be identified, which can be utilized to identify the other user, as in Step 460.

According to some embodiments, engine 200 can also, in concert with performing Step 460, proceed to continuously monitoring the data collected by UE 102, which can enable updates for the situation detected in Ste 456.

In Step 462, engine 200 can generate, compile or cause the generation of an electronic message, which can include information related to the event, user, location, and the like. For example, a message can be generated that includes, but is not limited to, text, coordinates, pictures, audio, and the like, related to the event and user involved in the event. The message can be addressed to the identified user (from Step 460), which can be addressed according to protocols for, but not limited to, a telephone message, SMS, MMS, email, social media message, audio message via an associated AP device of the other user, app notification, and the like.

And, in Step 464, the compiled electronic message can be communicated/sent to the other user, thereby alerting that other user(s) to the event detected in Step 456. In some embodiments, given that the processing of Process 450 recursively proceed to continued monitoring after the event detection (as per Step 460, supra), a subsequent set of messages can be provided to the other user, which can provide updates to the user's condition.

Figure 7:
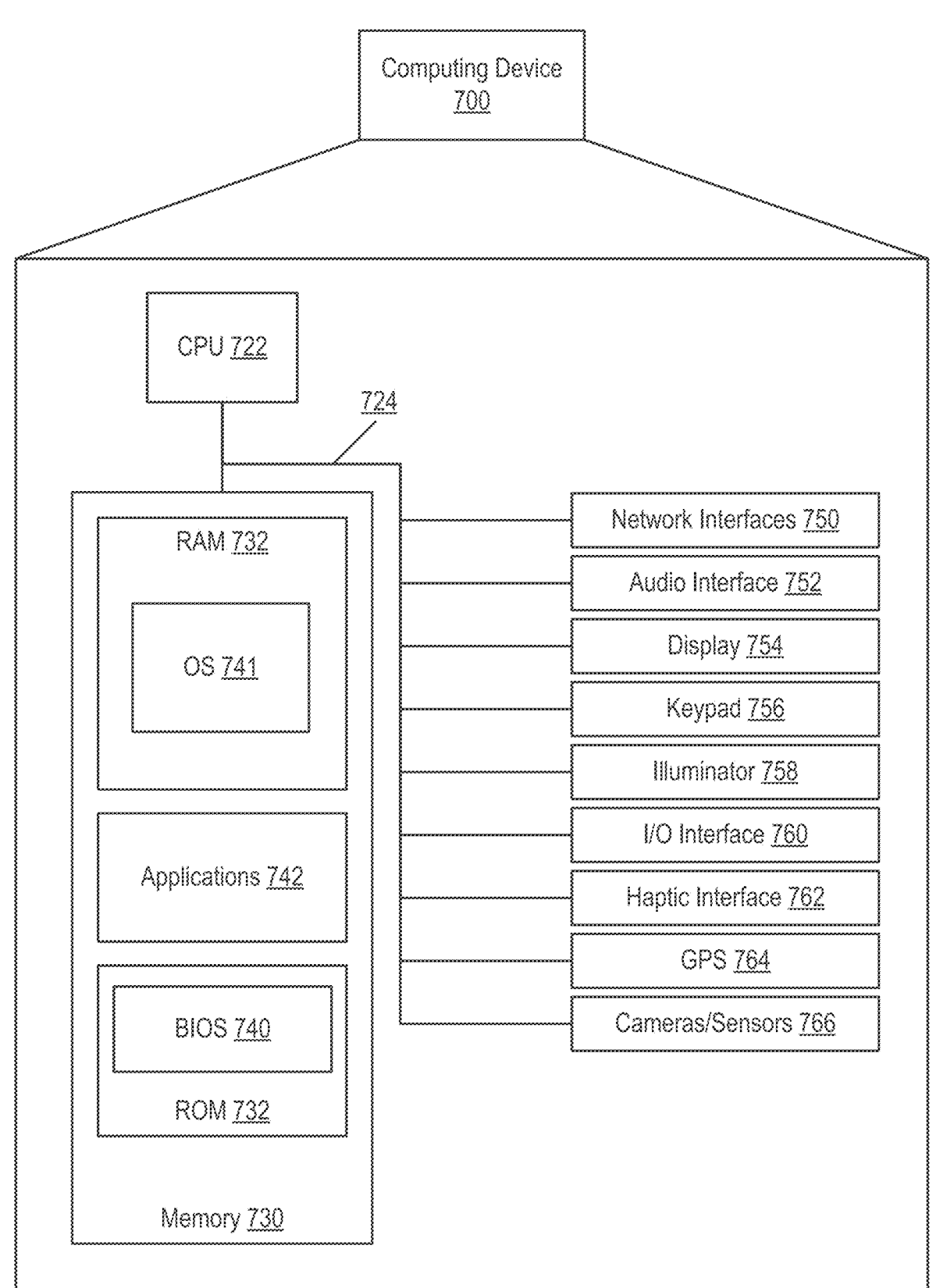
FIG. 7 is a block diagram illustrating a computing device showing an example of a client or server device used in various embodiments of the present disclosure.

FIG. 7 is a schematic diagram illustrating a client device showing an example embodiment of a client device that may be used within the present disclosure. Client device 700 may include many more or less components than those shown in FIG. 7. However, the components shown are sufficient to disclose an illustrative embodiment for implementing the present disclosure. Client device 700 may represent, for example, UE 102 discussed above at least in relation to FIG. 1.

As shown in the figure, in some embodiments, Client device 700 includes a processing unit (CPU) 722 in communication with a mass memory 730 via a bus 724. Client device 700 also includes a power supply 726, one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal or electromagnetic sensors 766. Device 700 can include one camera/sensor 766, or a plurality of cameras/sensors 766, as understood by those of skill in the art. Power supply 726 provides power to Client device 700.

Client device 700 may optionally communicate with a base station (not shown), or directly with another computing device. In some embodiments, network interface 750 is sometimes known as a transceiver, transceiving device, or network interface card (NIC).

Audio interface 752 is arranged to produce and receive audio signals such as the sound of a human voice in some embodiments. Display 754 may be a liquid crystal display (LCD), gas plasma, light emitting diode (LED), or any other type of display used with a computing device. Display 754 may also include a touch sensitive screen arranged to receive input from an object such as a stylus or a digit from a human hand.

Keypad 756 may include any input device arranged to receive input from a user. Illuminator 758 may provide a status indication and/or provide light.

Client device 700 also includes input/output interface 760 for communicating with external. Input/output interface 760 can utilize one or more communication technologies, such as USB, infrared, Bluetooth™, or the like in some embodiments. Haptic interface 762 is arranged to provide tactile feedback to a user of the client device.

Optional GPS transceiver 764 can determine the physical coordinates of Client device 700 on the surface of the Earth, which typically outputs a location as latitude and longitude values. GPS transceiver 764 can also employ other geo-positioning mechanisms, including, but not limited to, tri-angulation, assisted GPS (AGPS), E-OTD, CI, SAI, ETA, BSS or the like, to further determine the physical location of client device 700 on the surface of the Earth. In one embodiment, however, Client device may through other components, provide other information that may be employed to determine a physical location of the device, including for example, a MAC address, Internet Protocol (IP) address, or the like.

Mass memory 730 includes a RAM 732, a ROM 734, and other storage means. Mass memory 730 illustrates another example of computer storage media for storage of information such as computer readable instructions, data structures, program modules or other data. Mass memory 730 stores a basic input/output system ("BIOS") 740 for controlling low-level operation of Client device 700. The mass memory also stores an operating system 741 for controlling the operation of Client device 700.

Memory 730 further includes one or more data stores, which can be utilized by Client device 700 to store, among other things, applications 742 and/or other information or data. For example, data stores may be employed to store information that describes various capabilities of Client device 700. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 700.

Applications 742 may include computer executable instructions which, when executed by Client device 700, transmit, receive, and/or otherwise process audio, video, images, and enable telecommunication with a server and/or another user of another client device. Applications 742 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/ configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:

connecting, by a device, to a first network, wherein the device comprises location tracking capabilities;

continuous monitoring, by the device, according to a predetermined time period, location data and network data related to the device and the first network;

determining, by the device, to switch connections to a second network based on the monitoring, the determination comprising automatically connecting to the second network; and monitoring and collecting, by the device, event data related to the device, the event data comprising motion data collected by at least one sensor of the device;

determining, by the device, a motion pattern from the motion data based on the motion data and stored motion pattern data associated with different types of events; and analyzing, by the device, the event data including the motion pattern, and determining whether the motion pattern indicates a type of event, wherein:

when the type of event is indicated by the event data, generating an electronic message and communicating the electronic message to a device of another user, the electronic message comprising an indicator of the type of event and location information of the device at a time of the event, and when the event data does not indicate the type of event, continue the monitoring of the event data.

2. The method of claim 1, further comprising:

analyzing the location data; and determining, based on the analysis, information related to movements of the device, wherein the movements correspond to at least one of motion and a current location of the device.

3. The method of claim 2, further comprising:

determining to maintain the connection to the first network based on the determined information, wherein the device performs the continuous monitoring based on the first network connection.

4. The method of claim 2, wherein the determination to switch connections is based on the determined information.

5. The method of claim 1, further comprising:

identifying, based on the continuous monitoring by the device, network data of the second network;

analyzing the network data of the second network based at least on the network data of the first network; and determining, based on the analysis of the first and second network data, to switch connections.

6. The method of claim 1, wherein the first network and the second network are at least one of a cellular and wireless network, wherein each of the first and second network are provided by a separate access point.

7. The method of claim 1, wherein the event data comprises data corresponding to movements of the device, wherein the type of event corresponds to a type of the movements of the device.

8. The method of claim 1, wherein the event data comprises data corresponding to vitals of a user associated with the device, wherein in the type of event corresponds to a value of the vitals.

9. The method of claim 1, further comprising:

identifying the other user as an emergency contact of a user associated with the device, wherein contact information of the other user is retrieved from cloud storage.

10. The method of claim 1, wherein the device is a location tracking device, wherein the device is associated with at least one of a user and item.

11. A device comprising:

location tracking capabilities; and a processor configured to:

connect to a first network;

continuously monitor, according to a predetermined time period, location data and network data related to the device and the first network;

determine to switch connections to a second network based on the monitoring, the determination comprising automatically connecting to the second network;

monitor and collect event data related to the device, the event data comprising motion data collected by at least one sensor of the device;

determine a motion pattern from the motion data based on the motion data and stored motion pattern data associated with different types of events; and analyze the event data including the motion pattern, and determining whether the motion pattern indicates a type of event, wherein:

when the type of event is indicated by the event data, generate an electronic message and communicating the electronic message to a device of another user, the electronic message comprising an indicator of the type of event and location information of the device at a time of the event, and when the event data does not indicate the type of event, continue the monitoring of the event data.

12. The device of claim 11, wherein the processor is further configured to:

analyze the location data; and determine, based on the analysis, information related to movements of the device, wherein the movements correspond to at least one of motion and a current location of the device, wherein the determination to switch connections is based on the determined information.

13. The device of claim 11, wherein the processor is further configured to:

determine information related to movements of the device, wherein the movements correspond to at least one of motion and a current location of the device; and determine to maintain the connection to the first network based on the determined information, wherein the device performs the continuous monitoring based on the first network connection.

14. The device of claim 11, wherein the processor is further configured to:

identify, based on the continuous monitoring by the device, network data of the second network;

analyze the network data of the second network based at least on the network data of the first network; and determine, based on the analysis of the first and second network data, to switch connections, wherein the first network and the second network are at least one of a cellular and wireless network, wherein each of the first and second network are provided by a separate access point.

15. The device of claim 11, wherein the event data comprises data corresponding to at least one of movements of the device and vitals of a user, wherein the type of event corresponds to at least one of a type of the movements of the device and a value of the vitals.

16. A non-transitory computer-readable storage medium tangibly encoded with computer-executable instructions that when executed by a device, perform a method comprising:

connecting, by the device, to a first network, wherein the device comprises location tracking capabilities;

continuous monitoring, by the device, according to a predetermined time period, location data and network data related to the device and the first network;

determining, by the device, to switch connections to a second network based on the monitoring, the determination comprising automatically connecting to the second network;

monitoring and collecting, by the device, event data related to the device, the event data comprising motion data collected by at least one sensor of the device;

determining, by the device, a motion pattern from the motion data based on the motion data and stored motion pattern data associated with different types of events; and analyzing, by the device, the event data including the motion pattern, and determining whether the motion pattern indicates a type of event, wherein:

when the type of event is indicated by the event data, generating an electronic message and communicating the electronic message to a device of another user, the electronic message comprising an indicator of the type of event and location information of the device at a time of the event, and when the event data does not indicate the type of event, continue the monitoring of the event data.

17. The non-transitory computer-readable storage medium of claim 16, further comprising:

analyzing the location data; and determining, based on the analysis, information related to movements of the device, wherein the movements correspond to at least one of motion and a current location of the device, wherein the determination to switch connections is based on the determined information.

18. The non-transitory computer-readable storage medium of claim 16, further comprising:

determining, based on the analysis, information related to movements of the device, wherein the movements correspond to at least one of motion and a current location of the device; and determining to maintain the connection to the first network based on the determined information, wherein the device performs the continuous monitoring based on the first network connection.

19. The non-transitory computer-readable storage medium of claim 16, further comprising:

identifying, based on the continuous monitoring by the device, network data of the second network;

analyzing the network data of the second network based at least on the network data of the first network; and determining, based on the analysis of the first and second network data, to switch connections, wherein the first network and the second network are at least one of a cellular and wireless network, wherein each of the first and second network are provided by a separate access point.

20. The non-transitory computer-readable storage medium of claim 16, wherein the event data comprises data corresponding to at least one of movements of the device and vitals of a user, wherein the type of event corresponds to at least one of a type of the movements of the device and a value of the vitals.

* * * * *